United States Patent [19]

Yang et al.

[11] Patent Number: 5,434,483
[45] Date of Patent: Jul. 18, 1995

[54] AUTOMATIC COMPENSATION CIRCUIT FOR THE HORIZONTAL DEFLECTION OF A MULTIFREQUENCY COMPUTER MONITOR

[75] Inventors: Hsing N. Yang; Kwen-Yung Liu, both of Pan Chiao, Taiwan

[73] Assignee: Sampo Technology Corp., Taiwan

[21] Appl. No.: 137,775

[22] Filed: Oct. 19, 1993

[51] Int. Cl.⁶ .......................... H01J 1/02; H03K 4/90
[52] U.S. Cl. ................................. 315/371; 327/133; 327/103
[58] Field of Search ............... 315/371, 370; 348/806, 348/828, 554, 725; H04N 3/23, 3/233, 3/237; 307/228, 491, 519; 327/133, 131, 103, 102

[56] References Cited

U.S. PATENT DOCUMENTS

| 4,274,016 | 6/1981 | Ghahramani | 307/261 |
| 4,707,640 | 11/1987 | Onozawa et al. | 315/370 |
| 4,761,587 | 8/1988 | Wharton | 315/408 |
| 4,829,414 | 5/1989 | Yook | 315/411 |
| 5,325,025 | 6/1994 | Gawell et al. | 315/370 |

Primary Examiner—Timothy P. Callahan
Assistant Examiner—Terry L. Englund
Attorney, Agent, or Firm—Parkhurst, Wendel & Rossi

[57] ABSTRACT

An automatic compensation circuit for the horizontal deflection of a multifrequency computer monitor includes a transformer which has a primary winding and a secondary winding, a reverse coil which is reversely wired with respect to the secondary winding of the transformer being connected to the secondary winding of the transformer, a capacitor being serially connected between the reverse coil and a ground, a voltage/current converting circuit electrically connected to the first winding of the transformer, and a frequency/voltage converter being electrically connected between a computer monitor and the voltage/current converting circuit for converting the horizontal frequency of the computer monitor to a corresponding voltage and transmitting the converted voltage to the voltage/current circuit. The voltage/current converting circuit receives the converted voltage and responds to generate a corresponding current to actuate the transformer to generate a corresponding resonant frequency to compensate the horizontal deflection of the computer monitor.

2 Claims, 3 Drawing Sheets

AUTOMATIC COMPENSATION CIRCUIT FOR THE HORIZONTAL DEFLECTION OF A MULTIFREQUENCY COMPUTER MONITOR

FIELD OF THE INVENTION

This invention relates to an automatic compensation circuit for the horizontal deflection of a multifrequency computer monitor especially one which is allowed to correct the horizontal deflection distortion in different frequencies, i.e., without any controlling dead angle.

BACKGROUND OF THE INVENTION

The conventional computer monitor has a coil for controlling the horizontal deflection thereof. The coil does not function well in high frequency thus causing a distortion problem on the screen of the monitor. Conventionally, the distortion problem as mentioned is solved by introducing a combination of coil and capacitor. However, different combinations of coil and capacitor are required for different frequencies to correct the distortion such as in a multifrequency computer monitor. FIG. 6 illustrates a conventional horizontal deflection circuit 30 and the compensation circuit 3 therefor. The horizontal deflection circuit 30 comprises a transistor 31, a damped diode 32, an oscillating capacitor 33, and a deflection coil 34 connected in parallel. A driving signal from a horizontal driving circuit (not shown) is inputted to the horizontal deflection circuit 30. The compensation circuit 3 comprises a first coil 35 electrically connected to the deflection coil 34 of the deflection circuit 30 in series, a second coil 36 connected to the first coil 35 in series, and a capacitor 41 connected to the second coil 36 in series. A plurality of shunted capacitors 42, 43, 44, and 45 are connected to the capacitor 41 in parallel. A first switch 51 is connected to two distal ends of the second coil 36 in parallel. A plurality of switches 52, 53, 54, and 55 are respectively connected to the capacitors 42, 43, 44, and 45 and then connected to ground. The capacitors 41 to 45 have different capacitances from each other. For convenience, the switches 52, 53, 54, and 55 are respectively called the second, the third, the fourth, and the fifth switch. The switches 51 to 55 are controlled by a control circuit not shown in the figure. Suppose the frequency range is from 32 kilo-hertz to 78 kilo-hertz. The control circuit will control the ON/OFF of the switches, thus causing different combinations of the capacitors and the coils.

The capacitors and the coils combinations are illustrated with respect to different frequencies as following:

for the capacitors at 78 kilo-hertz: only the first switch 51 is ON, selecting the capacitor 41;

at 64 kilo-hertz: only the first switch 51 and the second switch 52 are ON, selecting the capacitors 41 and 42;

at 56 kilo-hertz: only the switches 51, 52, and 53 are ON, selecting the capacitors 41, 42, and 43;

at 48 kilo-hertz: only the switches 52, 53, and 54 are ON, selecting the capacitors 41, 42, 43, and 44;

at 31 kilo-hertz: only the switches 51, 52, 53, 54, and 55 are ON, selecting the capacitors 41, 42, 43, 44, and 45.

For the Coils from 31 kilo-hertz to 48 kilo-hertz: the switch 51 is OFF and the coils 35 and 36 are selected;

from 48 kilo-hertz to 78 kilo-hertz: the switch 51 is ON and only the coil 35 is selected.

Therefore, by means of the control circuit and the switches, a corresponding combination of the coils and the capacitors is selected for compensation in different frequencies. However, there are some drawbacks:

(1) controlling dead angles: The capacitors are constant, thus only in the above frequencies can the compensation achieve linear compensation, as to other frequencies such as 70 kilo-hertz, 61 kilo-hertz, 50 kilo-hertz, 38 kilo-hertz, 35 kilo-hertz, are all controlling dead angles.

(2) using too many components thus occupying space: The components used including the switches 51 to 55, the capacitors 41 to 45, the coils 35 and 36, and the control circuit occupy too much space.

(3) high cost: There are too many components thus incurring high cost.

SUMMARY OF THE INVENTION

It is an object of the present invention to provide an automatic compensation circuit which is allowed to automatically compensate the horizontal deflection circuit of a multifrequency computer monitor without any dead angles as in the conventional compensation circuit.

It is another object of the present invention to provide an automatic compensation circuit which does not require a plurality of switches and capacitors, thus saving considerable space and cost therefor.

It is one aspect of the present invention to provide an automatic compensation circuit for the horizontal deflection of a multifrequency computer monitor comprising a transformer which has a primary winding and a secondary winding, a reverse coil which is reversely wired with respect to the secondary winding of the transformer being connected to the secondary winding of the transformer, a capacitor being serially connected between the reverse coil and a ground, a voltage/current converting circuit electrically connected to the first winding of the transformer, and a frequency/voltage converter being electrically connected between a computer monitor and the voltage/current converting circuit for converting the horizontal frequency of the computer monitor to a corresponding voltage and transmitting the converted voltage to the voltage/current converting circuit. The voltage/current converting circuit receives the converted voltage and responds to generate a corresponding current to actuate the transformer to generate a corresponding resonant frequency to compensate the horizontal deflection of the computer monitor.

These and additional objects, if not set forth specifically herein, will be readily apparent to those skilled in the art from the detailed description provided hereunder, with appropriate reference to the accompanying drawings.

DETAILED DESCRIPTION OF THE PREFERRED EMBODIMENTS

Figure 1:
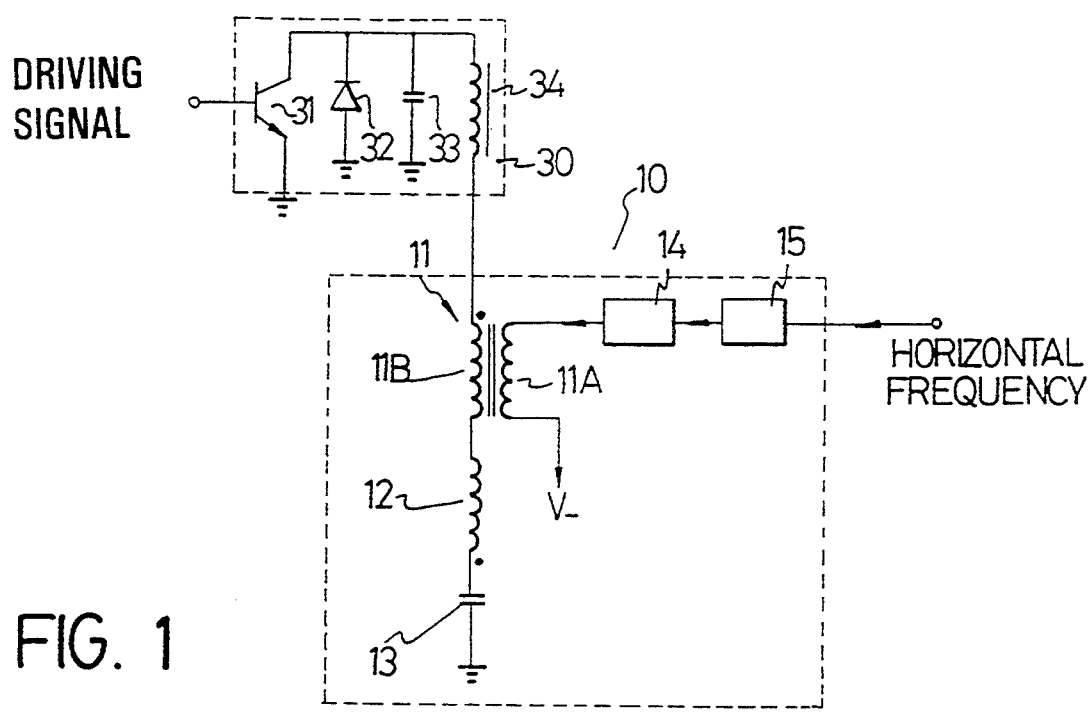
FIG. 1 is a circuit diagram in accordance with the present invention; wherein a voltage/current converting circuit thereof is merely shown by a simple block.

Referring to FIG. 1, a conventional horizontal deflection circuit 30 comprises a transistor 31, a damped diode 32, an oscillating capacitor 33, and a deflection coil 34 connected in parallel as illustrated previously. An automatic compensation circuit 10 in accordance with the present invention is electrically connected to the deflection coil 34 of the deflection circuit 30. The automatic compensation circuit 10 comprises a transformer 11 which has a primary winding 11A and a secondary winding 11B. The primary winding 11A has a terminal connected to a negative power source V−. A reverse coil 12 which is reversely wired with respect to the secondary winding 11B of the transformer 11 is electrically connected to the secondary winding 11B of the transformer 11. A capacitor 13 is serially connected between the reverse coil 12 and a ground. A voltage/current converting circuit 14 is electrically connected to the first winding 11A of the transformer 11. A frequency/voltage converter 15 is electrically connected between a computer monitor (not shown) and the voltage/current converting circuit 14 for converting the present horizontal frequency of the computer monitor to a corresponding voltage and transmitting the converted voltage to the voltage/current converting circuit 14. The voltage/current converting circuit 14 receives the converted voltage and responds to generate a corresponding current to change the magnetic field of the primary winding 11A, thereby generating a corresponding induced current in the secondary winding 11B and compensating the deflection coil 34.

Figure 2:
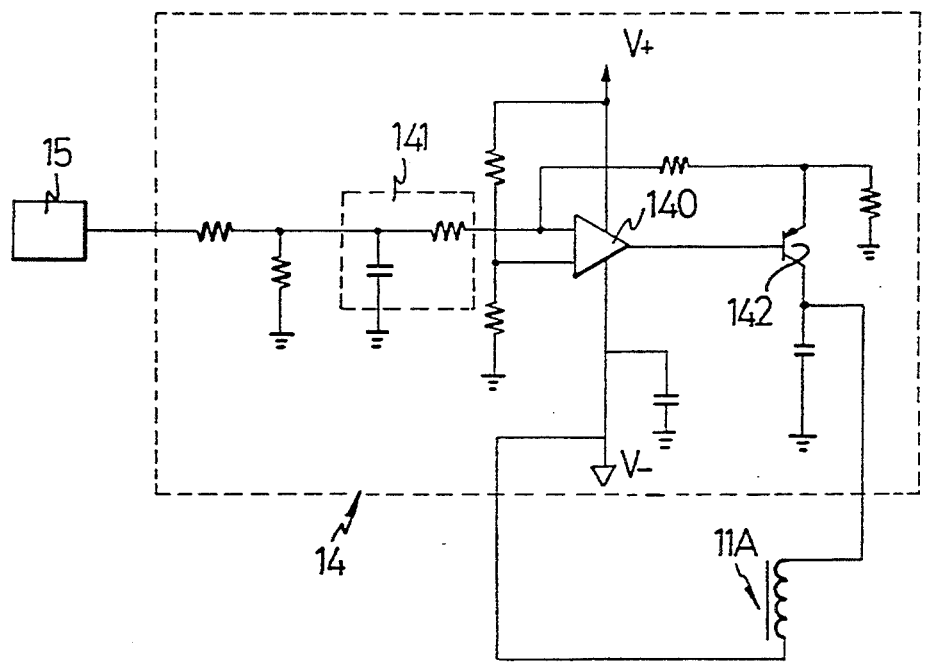
FIG. 2 is the detailed voltage/current converting circuit diagram of FIG. 1.
Figure 3:
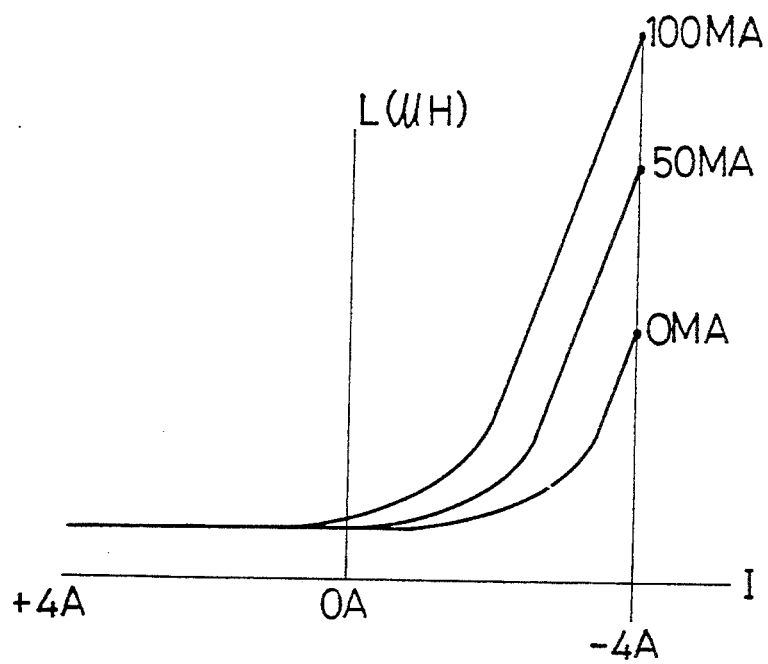
FIG. 3 is a characteristics graph of the transformer used in the present invention.
Figure 4:
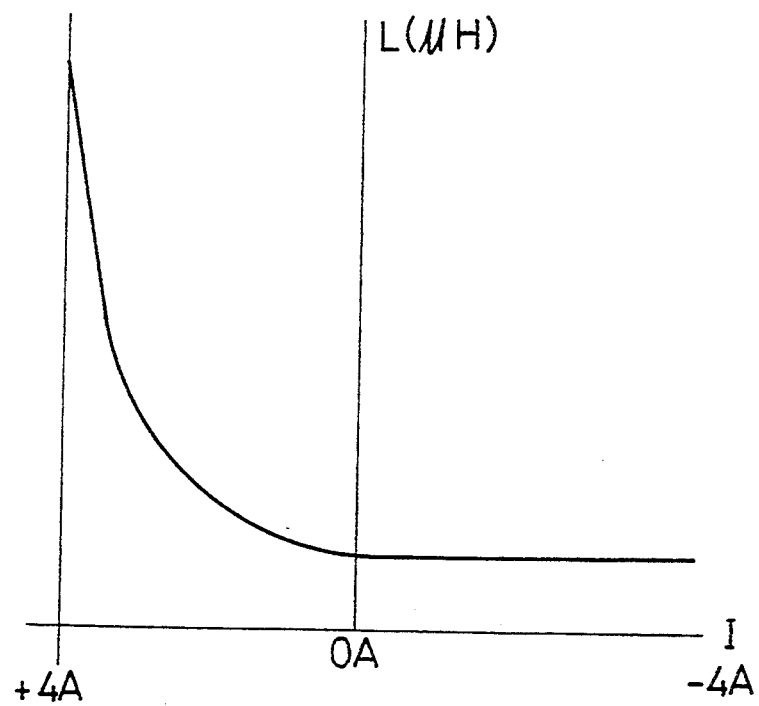
FIG. 4 is a characteristics graph of the reverse-wired coil used in the present invention.
Figure 6:
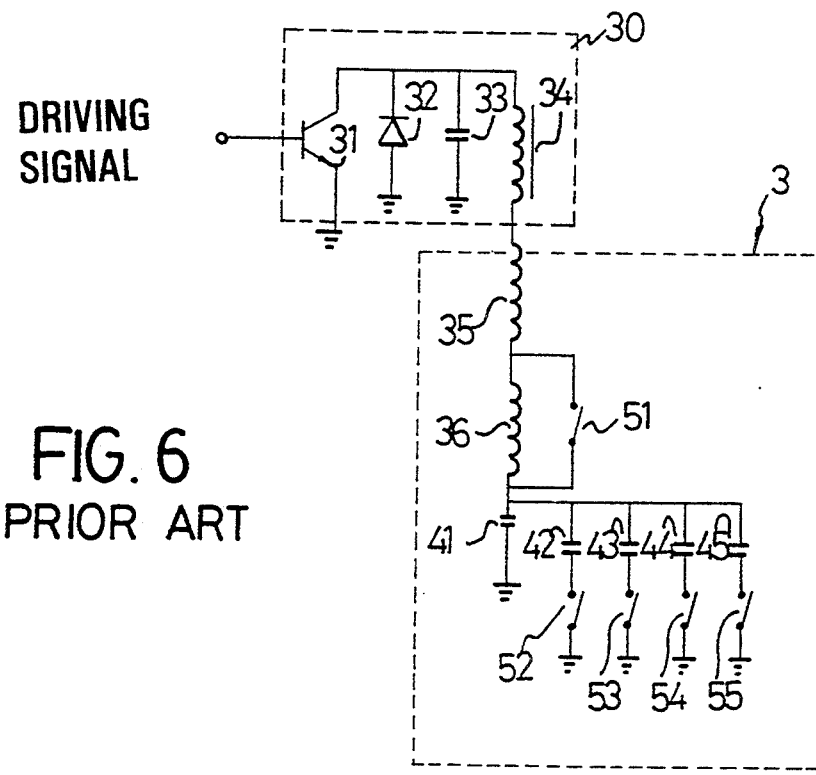
FIG. 6 is a conventional horizontal deflection circuit and a compensation circuit therefor.
Figure 5:
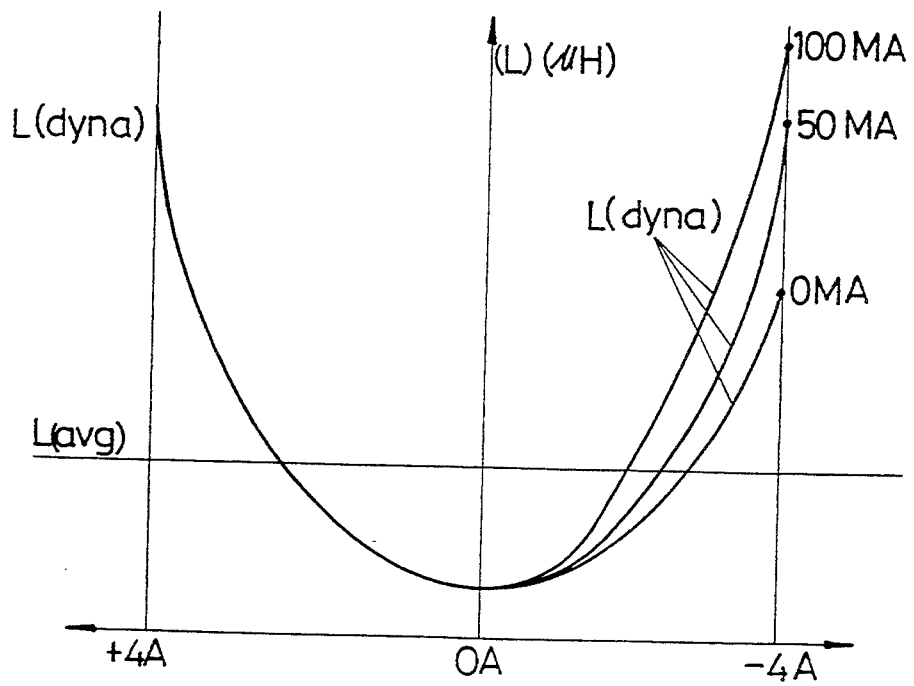
FIG. 5 is a combined characteristics graph of the transformer together with the reverse-wired coil in the present invention.

Referring to FIG. 2, the voltage/current converting circuit 14 comprises an amplifier 140 having an input terminal thereof electrically connected to the frequency/voltage converter 15 via an RC filter 141. An output terminal of the amplifier 140 is electrically connected to a transistor 142 which has an emitter thereof connected to the input terminal of the amplifier 140. The transistor 142 has a collector thereof connected to the primary winding 11A of the transformer 11 which is further connected to the negative power source V−. The frequency/voltage converter 15 outputs a converted voltage which is further filtered by the RC filter 141. The filtered voltage is amplified by the amplifier 140 to actuate the transistor 142, which in turn outputs a corresponding current to the primary winding 11A of the transformer 11. Different current values cause the secondary winding 11B and the reverse coil 12 to generate different inductance values. For example, FIG. 3 illustrates the transformer 11 has different inductance-current characteristics curves responding to different primary current I. FIG. 4 illustrates the inductance-current characteristic curve of the reverse coil 12. FIG. 5 illustrates the different inductance-current characteristics curves of the transformer 11 together with the reverse coil 12 responding to different primary current I.

Particularly referring to FIG. 5, the combined characteristic curves from of the secondary winding 11B of the transformer 11 and the reverse coil 12 are obtained and supported by the following equations:

$$L = L_{AVG} + L_{DYNA}$$

$$V = W \cdot L_{DYNA} \cdot I_{DEF}$$

$$V = Z_C \cdot I_{DEF}$$

$$= I_{DEF}/W \cdot C$$

$$= I_{DEF}/2\pi \cdot f \cdot C$$

$$V_{DYNA} = W \cdot L_{AVG} \cdot I + W \cdot L_{DYNA} \cdot I + Z_C \cdot I$$

Where, $L_{AVG}$: the average inductance of the secondary winding 11B of the transformer 11 and the reverse coil 12;

$L_{DYNA}$: the dynamic inductance of the secondary winding 11B of the transformer 11 and the reverse coil 12 after both of which are serially connected and passed by the deflection current;

$Z_C$: the impedance of the capacitor 13;

$I_{DEF}$: deflection current through the deflection coil 34;

$V$: the voltage across the capacitor 13;

$V_{DYNA}$: the dynamic voltage caused by the serially connected coils 11B and 12.

From FIG. 5, it is noted that the inductance of the transformer 11 is varied according to different primary current values, thus changing the resonant frequency of the compensation circuit 10 and compensate the deflection coil 34. Since the compensation is determined by the primary current I which is further determined by the horizontal frequency, therefore, there is no dead angle as described in the prior art. Since the present invention directly responds to different horizontal frequencies and generates corresponding compensation resonant frequencies, thus it is no need to prepare a plurality of switches and a specific control circuit to control the ON/OFF of each switch, thus saving spaces and cost.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. An automatic compensation circuit for the horizontal deflection of a multifrequency computer monitor comprising:

a transformer which has a primary winding connected to a negative power source and a secondary winding connected to a horizontal deflection circuit;

a reverse coil being reversely wired with respect to the secondary winding of the transformer and being connected to said secondary winding of said transformer;

a capacitor being serially connected between said reverse coil and a ground;

a voltage/current converting circuit being electrically connected to said primary winding of said transformer; and a frequency/voltage converter being electrically connected between said computer monitor and said voltage/current converting circuit for converting the horizontal frequency of said computer monitor to a corresponding voltage and transmitting the converted voltage to said voltage/current converting circuit;

whereby said voltage/current converting circuit receives the converted voltage and generates a corresponding current to actuate said transformer to generate a corresponding resonant frequency to compensate the horizontal deflection of the computer monitor.

2. The automatic compensation circuit as claimed in claim 1, wherein said voltage/current converting circuit comprises an amplifier having an input terminal electrically connected to said frequency/voltage converter via an RC filter and an output terminal electrically connected to a transistor which has an emitter thereof connected to the input terminal of said amplifier, said transistor having a collector thereof connected to said primary winding of said transformer.

* * * * *